Feb. 27, 1968     A. G. BODINE     3,370,758
SONIC TOOL FOR ACTIVATING THE FLOW OF
PARTICULATE MATERIAL
Filed Dec. 19, 1966     2 Sheets-Sheet 1
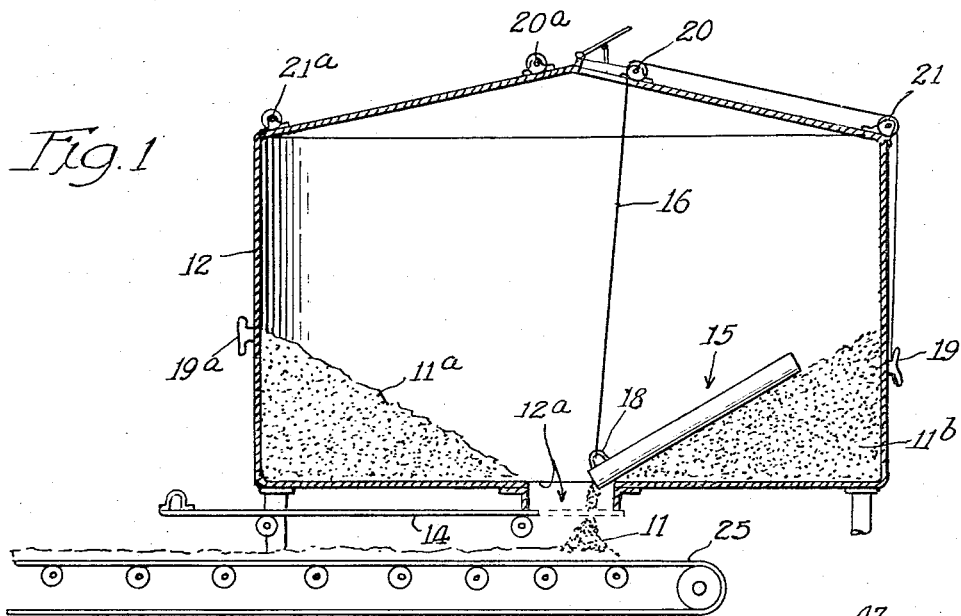
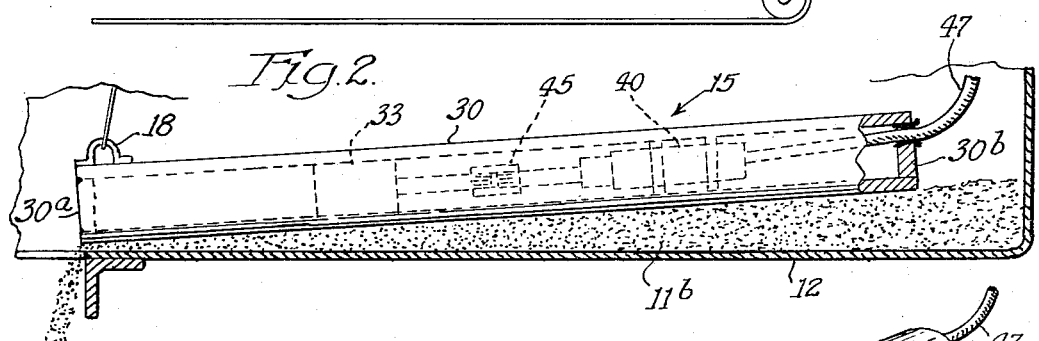
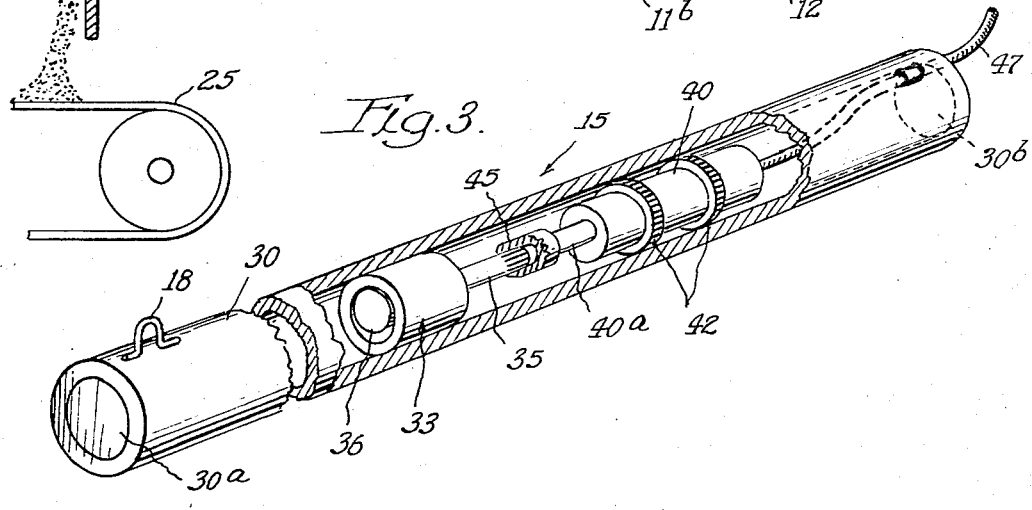
INVENTOR.
Albert G. Bodine
BY Edward A. Sokolski
Attorney

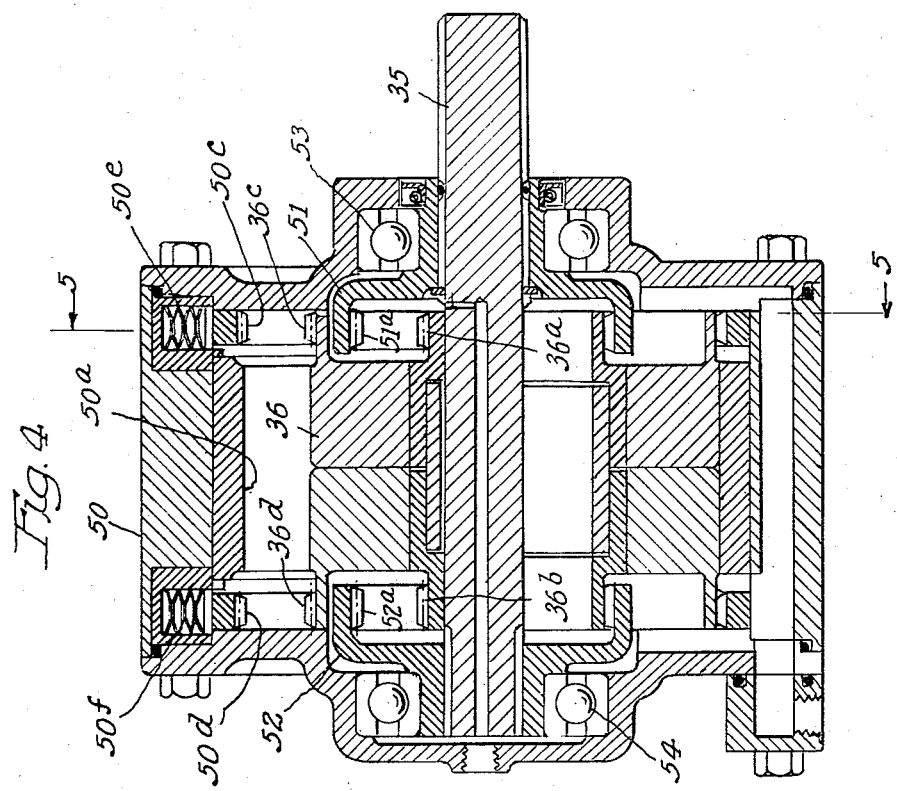
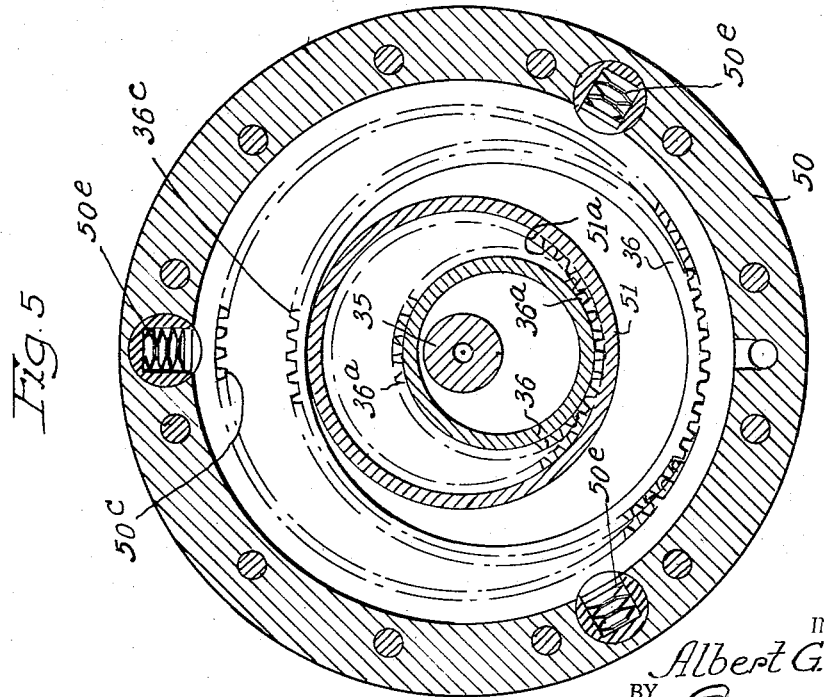

3,370,758
SONIC TOOL FOR ACTIVATING THE FLOW
OF PARTICULATE MATERIAL
Albert G. Bodine, 7877 Woodley Ave.,
Van Nuys, Calif. 91406
Filed Dec. 19, 1966, Ser. No. 603,040
8 Claims. (Cl. 222—196)

ABSTRACT OF THE DISCLOSURE

A portable sonic tool including an elongated hollow elastic member in which is contained an orbiting-mass oscillator. The vibrational output of the oscillator is coupled to the elastic member and such oscillator rotatably driven by a motor, also contained within the elastic member, at a speed such as to cause a resonant vibration of the elastic member. The tool forms a self-contained resonant vibration system which when placed on the surface of particulate material to be activated effectively fluidizes such material by causing it to vibrate randomly as a resistive impedance load.

---

This invention relates to a sonic tool for activating the flow of particulate material and more particularly to such a tool which is resonantly vibrated by means of an orbiting-mass oscillator.

In removing particulate material such as grain, granular ores, coal and the like, from storage containers such as bins, tanks and silos, a gravity feed system is generally utilized whereby the particulate material is permitted to flow out the bottom of the container. Such material often assumes a static angle of repose which makes it impossible to empty the container by gravity feed alone. The removal of this material often requires a considerable amount of extra work, involving, for example, manual removal, the installation of complex handling equipment such as drag line buckets, or the use of skip-load tractors to push the material to the outlet opening. To alleviate this problem silos having conical or pyramidal bottom portions are often utilized and the silo is made relatively tall to provide a hydrostatic head to implement the flow. Tall silos tend to be relatively expensive in construction, especially in view of the necessity for providing structure capable of handling high hydrostatic forces. Further, rectangular silos with pyramidal bottoms have a disadvantage in that pyramidal shaped bottoms tend to trap material in the four corners thereof. Thus, the various measures for overcoming the static repose of material in storage members, while somewhat effective in overcoming this problem, pose distinct problems in themselves.

A relatively shallow storage facility which is close to the ground has distinct advantages from the point of view of economy, stability and ease of installation. In addition, this type of silo could be moved from place to place as required providing maximum utilization of the storage facility at a relatively low handling cost.

This invention is also particularly directed to the loading and unloading of barges, which are extreme examples of flat-shaped containers with the above mentioned attendant problems.

The device of this invention makes possible the utilization of such a simple shallow storage facility by making use of sonic energy to activate the particulate material so that it readily flows from the storage member. The sonic energy is transmitted to the particulate material from a self-contained resonant vibration system, the material forming a resistive impedance load on such system. The resonant vibration system is formed by an elesatic hollow enclosure member in which is contained an orbiting-mass oscillator. The vibrational output of the oscillator is acoustically coupled to the elastic member and the oscillator driven at a rotation frequency such as to cause resonant elastic vibration of the enclosure member. The sonic tool is portable and is set in place on the particulate material, such particulate material vibrating randomly and assuming a highly fluid condition in response ot the sonic energy. The sonic energy thus highly fluidizes the granular material, enabling it to flow freely from the storage member. Such fluidization also thoroughly mixes the granular material and prevents the material from agglomerating.

It has been found most helpful in analyzing the operation of the device of this invention to analogize the acoustically vibrating circuit involved to an equivalent electrical circuit. This sort of approach to analysis is well known to those skilled in the art and is described, for example, in Chapter 2 of "Sonics" by Hueter and Bolt, published in 1955 by John Wiley and Sons. In making such an analogy, force F is equated with electrical voltage E, velocity of vibration $u$ is equated with electrical current $i$, mechanical compliance $C_m$ is equated with electrical capacitance $C_e$, mass M is equated with electrical inductance L, mechanical resistance (friction) $R_m$ is equated with electrical resistance R, and mechanical impedance $Z_m$ is equated with electrical impedance $Z_e$.

Thus, it can be shown that if a member is elastically vibrated by means of an acoustical sinusoidal force $F_0 \sin \omega t$ ($\omega$ being equal to $2\pi$ times the frequency of vibration), that $$Z_m = R_m + j\left(\omega M - \frac{1}{\omega C_m}\right) = \frac{F_0 \sin \omega t}{u} \quad (1)$$

Where $\omega M$ is equal $$\frac{1}{\omega C_m}$$

a resonant condition exists, and the effective mechanical impedance $Z_m$ is equal to the mechanical resistance $R_m$, the reactive impedance components $\omega M$ and $$\frac{1}{\omega C_m}$$

cancelling each other out. Under such a resonant condition, velocity of vibration $u$ is at maximum, power factor is unity, and energy is most efficiently delivered to a load to which the resonant system may be coupled.

It is to be noted that in the device of this invention the mass and compliance for forming the resonantly vibrating system are furnished by the structural members of such system themselves such that the particulate material is not incorporated as a reactance in such system. The particulate material under such conditions acts as a resistive impedance load which provides no significant reactive components. This employment of apparatus resonance results in a random vibration of the particles, rather than a lumped coherent vibration such as results from nonresonant vibrating apparatus, with a considerable relative motion occuring between the separate particles. It is believed that each of the individual irregular particles when energized by the sonic energy in this sonic resonant fashion separately vibrates in a random path with a relatively fixed radius of vibration which changes in direction but remains fixed in magnitude. Such random vibration effectively separates the particles so that they do not adhere to each other. The net result is a uniquely high degree of fluidization of the particulate material.

It is also important to note the significance of the attainment of high acoustical "Q" in the resonant system being driven, to increase the efficiency of the vibration thereof and to provide a maximum amount of energy for the flow activation. As for an equivalent electrical circuit, the "Q" of an acoustically vibrating circuit is defined as the sharpness of resonance thereof and is indicative of the ratio of the energy stored in each vibration cycle to the energy used in each such cycle. "Q" is mathematically equated to the ratio between $\omega M$ and $\omega R_m$. Thus, the effective "Q" of the vibrating circuit can be maximized to make for highly efficient, high-amplitude vibration by minimizing the effect of unnecessary friction in the circuit and/or maximizing the effect of mass in such circuit.

In considering the significance of the parameters described in connection with Equation (1), it should be kept in mind that the *total* effective resistance, mass, and compliance in the acoustically vibrating circuit are represented in the equation and that these parameters may be distributed throughout the system rather than being lumped in any one component or portion thereof.

It is also to be noted that an orbiting mass oscillator may be utilized in the device of the invention that automatically adjusts its output frequency to maintain resonance with changes in the characteristics of the load. Thus, in the face of changes in the effective impedance presented by the load, the system automatically is maintained in optimum resonant operation by virtue of the "lock-in" characteristics of applicant's unique orbiting-mass oscillator. The orbiting-mass oscillator automatically changes not only its frequency but its phase angle and therefore its power factor with changes in the resistive impedance load to assure optimum efficiency of operation at all times.

It is, therefore, an object of this invention to facilitate the flow of particulate material from a storage member.

It is a further object of this invention to provide means for utilizing sonic energy to enable the removal of particulate material from storage members.

It is still another object of this invention to provide sonic means for more economically handling particulate material.

It is still a further object of this invention to enable the utilization of simple and economical storage facilities for particulate material.

Other objects of this invention will become apparent from the following description taken in connection with the accompanying drawings of which:

FIG. 1 is an elevational view illustrating the utilization of a preferred embodiment of the device of the invention to remove particulate material from a storage bin;

FIG. 2 is a further view illustrating the removal process shown in FIG. 1 somewhat later in the removal operation;

FIG. 3 is a perspective view with partial cutaway section of a preferred embodiment of the device of the invention;

FIG. 4 is a cross-sectional view of an oscillator which may be utilized in the device of the invention; and FIG. 5 is a cross-sectional view taken along the plane indicated by 5—5 in FIG. 4.

Referring now to FIGS. 1 and 2, the utilization of a preferred embodiment of the device of the invention for removing particulate material from a storage bin is illustrated. Particulate material 11 which may comprise grain is in the process of being removed from storage bin 12 through opening 12a in the bottom of the bin and the opening provided by means of sliding door 14. As can be seen, the material 11a and 11b prior to sonic activation had assumed a static repose condition in the bin. Resting on the surface of material 11b on the right-hand side of the bin is sonic tool 15. Sonic tool 15 is lowered into position on top of material 11b and guided by means of cable 16 which is attached at one end thereof to hook 18 on the tool and at the other end thereof to cleat 19 which is attached to bin 12. The tool effectively "floats" on the surface of the material. Pulley wheels 20 and 21 are provided to facilitate the manipulation of the cable.

Sonic tool 15, as to be explained in connection with FIG. 3, is resonantly vibrated at a sonic frequency. Sonic energy is coupled to the surface of particulate material 11b and causes random vibration of such material in view of the fact that such material acts as a resistive load on the resonant vibration system. Such random vibration of the individual particles of material 11b causes a high degree of fluidization of such material thereby activating the flow thereof out of bin 12 onto conveyor belt 25. This flow continues until substatnially all of the material has been removed from the bin. This operation is repeated to remove material 11a, in this instance utilizing cleat 19a and pulley wheels 20a and 21a to guide cable 16.

As can be seen in FIG. 2, as the particulate material 11b flows out of the bin and the repose angle decreases, tool 15 moves downwardly closer to the bottom of the bin, at all times remaining generally near or on the surface of the particulate material.

Referring now to FIG. 3, a preferred embodiment of the device of the invention is illustrated. Sonic tool 15 comprises a tubular enclosure member 30 which is closed on both ends by means of caps 30a and 30b. Tubular enclosure member 30 is preferably made of a highly elastic material such as steel, or aluminum alloy. The housing of orbiting-mass oscillator 33 is attached to the inside of enclosure 30 as, for example, by press fitting. This oscillator may be of the type to be described in connection with FIGS. 4 and 5, having an eccentric rotor 36 which is rotatably driven around a race formed in the oscillator housing. Rotor 36 is rotatably driven by means of electric motor 40. Electric motor 40 is fitted within tubular member 30 by means of resilient bushings 42 which vibrationally isolate the motor from the walls of the enclosure. The drive shaft 40a of the motor is flexibly coupled to oscillator drive shaft 35 by means of splined coupler member 45. Electrical power is supplied to the motor through power cable 47.

To assume that the sonic tool in effect "floats" on the surface of the particulate material, a good air pocket should be formed therein by sealing the ends of tubular enclosure and the enclosure itself made of as lightweight material as feasible. Such lightweight construction, of course, also facilitates the handling of the unit.

Rotor 36 is rotatably driven by motor 40 at a rotation speed such as to cause resonant vibration of tubular enclosure 30. It is to be noted that the force pattern generated by means of oscillator 33 is a gyratory one, and this rotary vibratory motion tends to give the tool some degree of propulsive mobility along the surface of the particulate material so that it effectively moves along such surface to efficiently activate the entire area of such surface.

Referring now to FIGS. 4 and 5, the details of an orbiting-mass oscillator unit which may be utilized in the device of the invention are illustrated. The oscillator comprises a housing 50 in which is contained a rotor member 36. Rotor member 36 is rotatably driven around race 50a formed in the housing by means of drive members 51 and 52. Drive members 51 and 52 are attached to oscillator drive shaft 35 and are mounted for rotation on ball bearings 53 and 54, respectively. Drive members 51 and 52 have internal gear rings 51a and 52a thereon which engage rotor spur gear rings 36a and 36b, respectively. Rotor 36 further has spur gear rings 36c and 36d thereon which engage internal gear rings 50c and 50d attached to housing 50. Gear rings 50c and 50d are mounted in the housing on friction springs 50e and 50f, respectively, such springs providing some play in the gear rings to lessen the strain on the gear teeth as the rotor rotates.

Thus, as drive shaft 35 is rotatably driven, rotor 36 rolls around in race 50a in a path which is eccentrically related to the axis of the drive shaft. This generates a gyratory force pattern in housing 50.

The device of this invention thus provides highly effective means for activating the flow of particulate material from a container. This end result is achieved by generating high-level sonic energy in a portable tool which is placed and maintained on the surface of the particulate material so as to cause random sonic vibration thereof, resulting in extremely high fluidization of such material.

While the device of this invention has been described and illustrated in detail, it is to be clearly understood that this is intended by way of illustration and example only and is not to be taken by way of limitation, the spirit and scope of this invention being limited only by the terms of the following claims.

I claim:
1. A sonic tool for activating the flow of particulate material comprising:
    a resonant vibration member, said vibration member comprising an elongated elastic hollow enclosure member;
    an orbiting-mass oscillator contained within said enclosure member, the vibrational output of said oscillator being coupled to said vibration member;
    motor means for rotatably driving said oscillator at a rotation speed such as to cause resonant sonic vibration of said vibration member as a self-contained resonant vibration system; and
    means for maintaining said tool resting at the surface of said particulate material as the flow of said material progresses;
    whereby said material is activated by the resonant vibration of said vibration member with said material presenting a resistive impedance load on said vibration member.

2. The tool as recited in claim 1 wherein said vibration member comprises a tubular member closed at both ends thereof.

3. The tool as recited in claim 2 wherein said motor means includes a motor contained within said tubular member and further including means for vibrationally isolating said motor from said vibration member.

4. The tool as recited in claim 1 wherein said oscillator is adapted to generate gyratory vibrations.

5. In combination, a container member, particulate material contained in said container member, and sonic tool means for activating the flow of said particulate material from said container member comprising:
    an elastic hollow enclosure member;
    mechanical oscillator means for generating sonic vibrational energy, said oscillator means being contained within said enclosure member, the vibrational output of said oscillator means being coupled to said enclosure member;
    motor means for driving said oscillator means at a frequency such as to cause resonant vibration of said enclosure member as a self-contained resonant vibration system; and
    means for maintaining said enclosure member on the surface of said particulate material as the flow of said material progresses, said particulate material vibrating randomly as a resistive impedance load on said enclosure member.

6. The combination as recited in claim 5 wherein said oscillator means comprises an orbiting-mass oscillator having a gyratory vibrational output.

7. The combination as recited in claim 6 wherein said enclosure member is in the form of a tube closed at both ends thereof.

8. The combination as recited in claim 7 wherein said oscillator is press fitted within said tube.

References Cited
UNITED STATES PATENTS

| | | | |
|---|---|---|---|
| 1,927,075 | 9/1933 | Thomas | 74—87 |
| 2,174,348 | 9/1939 | Damond | 222—196 |
| 2,761,079 | 8/1956 | Giertz-Hedstrom et al. | 74—87 |
| 2,960,314 | 11/1960 | Bodine | 259—72 X |
| 3,166,772 | 1/1965 | Bodine | 74—87 X |
| 3,256,695 | 6/1966 | Bodine. | |
| 3,264,887 | 8/1966 | Holmes | 74—87 |
| 3,299,722 | 1/1967 | Bodine | 74—87 |
| 3,308,671 | 3/1967 | Bodine | 74—87 |

WALTER SOBIN, *Primary Examiner.*